Figure 1:
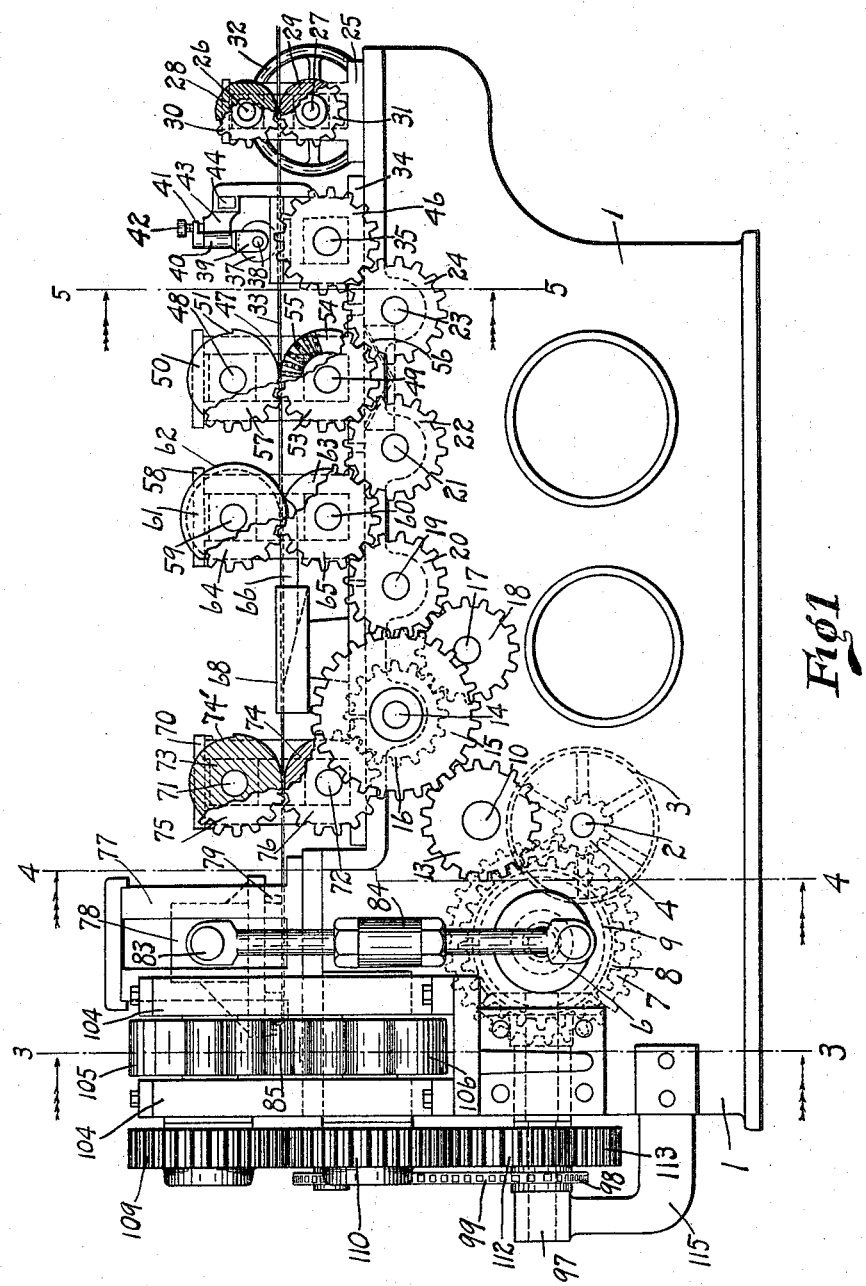

A. P. TUCKER.
MACHINE FOR MAKING PAPER FORMS.
APPLICATION FILED JULY 15, 1915.

1,160,962.

Patented Nov. 16, 1915.
4 SHEETS—SHEET 1.

Witnesses
L. M. Dunlap
Geo. H. Ricke.

Inventor
Andrew P. Tucker
by John W. Crehli
Attorney

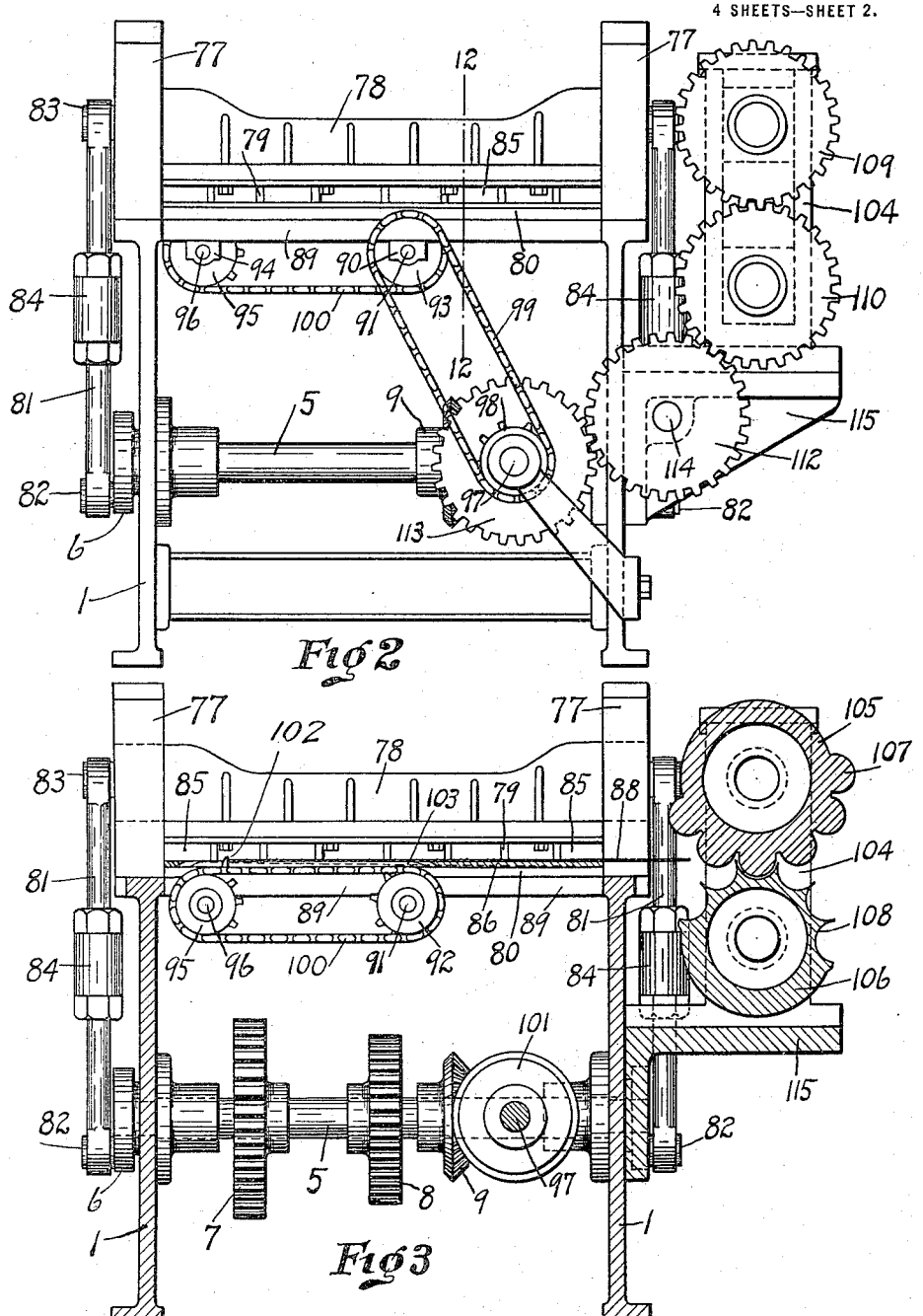

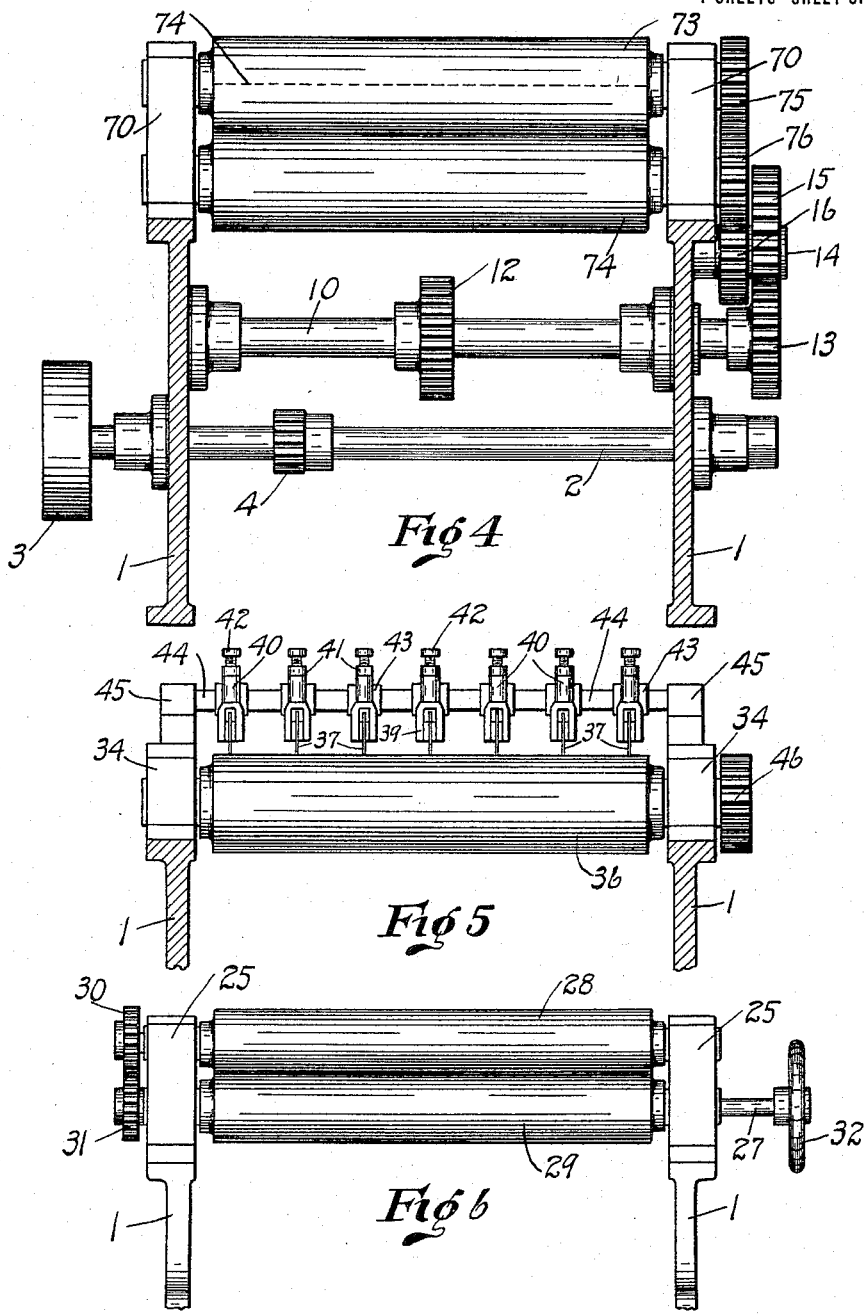

A. P. TUCKER.
MACHINE FOR MAKING PAPER FORMS.
APPLICATION FILED JULY 15, 1915.
1,160,962.
Patented Nov. 16, 1915.
4 SHEETS—SHEET 4.
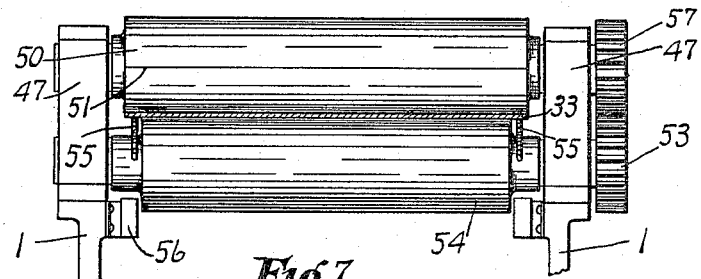
Fig 7
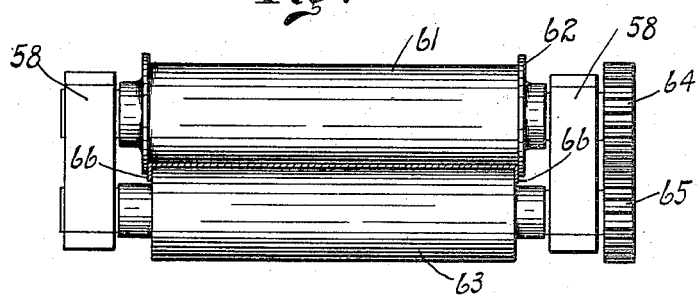
Fig 8
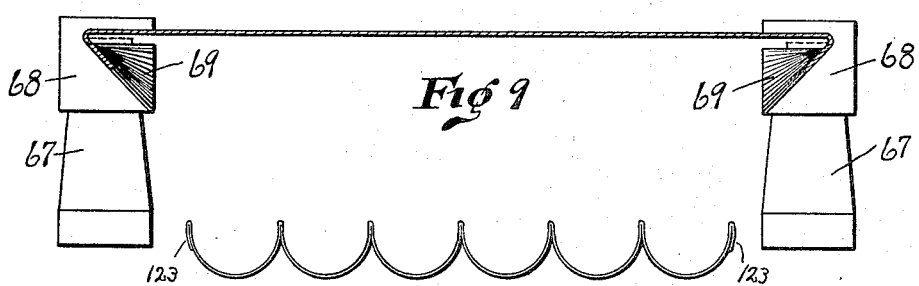
Fig 9
Fig 10
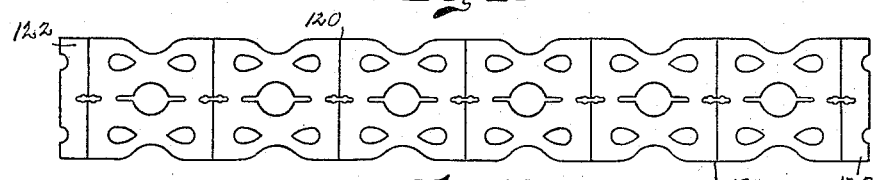
Fig 11
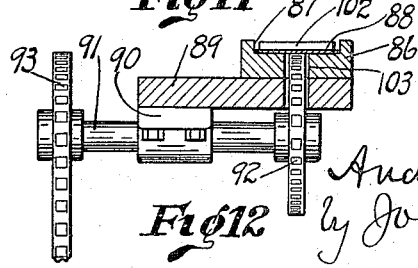
Fig 12
Witnesses
L. M. Dunlap
Geo. H. Ricke.
Inventor
Andrew P. Tucker
by John W. Strehli
Attorney

UNITED STATES PATENT OFFICE.

ANDREW P. TUCKER, OF CINCINNATI, OHIO, ASSIGNOR TO THE NO-BREAK EGG CARRIER COMPANY, OF CINCINNATI, OHIO, A CORPORATION OF OHIO.

MACHINE FOR MAKING PAPER FORMS.

1,160,962.	Specification of Letters Patent.	Patented Nov. 16, 1915.

Application filed July 15, 1915. Serial No. 40,126.

*To all whom it may concern:*

Be it known that I, ANDREW P. TUCKER, a citizen of the United States, residing at the city of Cincinnati, in the county of Hamilton and State of Ohio, have invented certain new and useful Improvements in Machines for Making Paper Forms, of which the following is a specification.

The object of my invention is to produce a simple and highly efficient, rapidly operating machine for making paper forms, in the present instance more particularly applicable to the manufacture of trays for egg carriers; I also having invented a machine for making egg carrier bodies into which such egg trays fit and with which they combine to make the finished egg carrier and for which machine I have applied for Letters Patent Serial No. 39,250.

In my present invention I arrange and combined sets of rolls, scoring knives, paste appliers, folding devices, cutting knives and forming rolls, in a unique, novel and efficiently operating combination in order to produce satisfactory results in the manufacture of paper forms, the machine operating automatically. Its various features and advantages will readily become apparent from the following specification.

In the accompanying drawings forming part of this specification Figure 1, is a side elevation of the machine, parts being broken away to illustrate construction, Fig. 2, is an end elevation of the machine, looking at it from the front at the point where the finished product leaves the machine, Fig. 3, is a sectional view, taken on the line 3—3 of Fig. 1, looking in the direction of the arrow, Fig. 4, is a sectional view, taken on the line 4—4 of Fig. 1, looking in the direction of the arrow, Fig. 5, is a sectional view taken on the line 5—5 of Fig. 1, looking in the direction of the arrow, Fig. 6, is a front view of ten forward feed rolls, through which the paper is started into the machine, Fig. 7, is a view looking toward the rear of the machine of the sector and feed roll operating with it for placing paste on the paper, the paper being shown in section taking paste, Fig. 8, is a view looking toward the rear of the machine, of the forming rolls, showing the paper in section receiving its first bend or fold, Fig. 9, is a front view of the folding, showing the paper in section, receiving its final fold, Fig. 10, is a side view of one of the finished tray forms, Fig. 11, is a plan view thereof, and Fig. 12, is a sectional view on the line 12—12 of Fig. 2.

I form the frame of the machine of two side frame pieces 1—1, pinned and connected together in any suitable manner. In these frames 1—1, and extending entirely across the machine, I place the driving shaft 2, carrying pulley 3, and a small drive gear 4; I similarly support the eccentric shaft 5, carrying the eccentrics 6—6, and gears 7, 8 and 9, the gear 7 being a large gear, gear 8 being somewhat smaller and gear 9 being a bevel gear; and I further provide shaft 10, which carries two gears 12 and 13, gear 12 being on inside of frame 1 and gear 13 on the outside thereof. The above shafts are properly journaled in the sides of the machine in suitable bearings.

On the outside of the frame of the machine I journal on studs, see Fig. 1, a number of gears or idlers, as follows; on the stud 14 I carry the idler gears 15 and 16, on stud 17 I carry idler gear 18, on stud 19 I carry idler gear 20, on stud 21 I carry idler gear 22 and on stud 23 I carry idler gear 24. On the top of the machine or frames 1—1, I place brackets or housings for supporting the shafts and rolls and their bearings, which I will now describe. I provide brackets or housings 25, which support the shafts 26 and 27, said shafts carrying the feed rolls or rollers 28 and 29, the shafts 26 and 27 carrying the gears 30 and 31, which mesh when the hand wheel 32 is turned, said hand wheel being on shaft 27 of the lower roll; by this means the paper 33 is started into the machine. In short brackets or housings 34, I support the shaft 35 on which is a roll 36 which operates to pass the paper under the scoring knives 37; these knives are each supported on a pin 38, which pin, in each instance, is carried by a jaw 39, which jaw at its upper extremity passes through a sleeve 40, on top of which is a finger 41 through which an adjusting screw 42 passes thus permitting vertical adjustment of the scoring knives or wheels. Through an arm 43 on the sleeve 40, passes a recess, through the agency of which the scoring knives 37 are slipped onto or over the supporting bar 44 which is supported in brackets 45 which are on the brackets 34 above referred to; and on the shaft 35, I place a gear 46 which operates the lower roller 36, to feed and support the paper 33 under the scoring knives. this gear 46 meshing with the idler gear 24.

In brackets or housings 47, I journal shafts 48 and 49, the shaft 48 carrying the upper sector roll 50 having cut away face or section 51 and also carrying the gear 57 which meshes with gear 53 on the lower shaft 49, this shaft carrying the paste roll 54, the said roll 50 acting as an intermediate feed roll as the paper 33 is passing over the paste roll 54, the paste roll 54 also acts as a feeding roll but for convenience it is called a paste roll. The paste roll 54 at each end is cut away and here I place a series of rods or fingers 55. On the inside of frames 1—1, I connect, at each side, a paste trough or reservoir 56 into which the fingers 55 pass to receive the paste at each revolution, and as the paper 33 is passing through the rolls 50 and 54 and over the fingers 55, a series of paste dots or spots are received by the paper at each edge thereof; on the said upper shaft 48, I carry a gear 57 which meshes with gear 53 which meshes with idler gear 22 and thus the rolls 51 and 54 are revolved. In another set of brackets or housings 58, I journal shafts 59 and 60, the shaft 59 carrying the upper roll 61 which at each end is formed with a flange 62, and the shaft 60 carries the lower roll 63 which is somewhat shorter than roll 61, so that it will just come within the flanges 62, to allow for the thickness of the paper 33 between its end and the inner face of the flange 62, so that when the rolls 61 and 63 revolve, the paper 33 is folded or bent over at practically a right angle, which is the first fold for the paper on its passage through the machine, (see particularly Fig. 8). On the shaft 59 I carry gear 64 and on shaft 60 I carry a gear 65, the gear 65 meshing with the idler gear 20 and thus the rolls are revolved. These rollers may be called the folding rolls. The turn down edge made by these rolls is marked 66, (see particularly Fig. 8).

In brackets 67, I carry and support a folding device 68, which folds the paper edge 66 into its final form or fold as shown by dotted lines in Fig. 9. This folding device 68, at each side of the machine has an inclined slot 69 into which the paper enters, the slot gradually diminishes in depth until the final fold of the paper is reached as seen in dotted lines in Figs. 1 and 9. The paper when thus folded has a double edge at each side thereof. I further provide brackets or housings 70, in which I journal and support two shafts 71 and 72, the shaft 71 carrying a sector roll 73 and the shaft 72 carrying the lower roll 74, the sector roll 73 having the cut away face or section 74'; at its outer end the shaft 71 carries the gear 75 and the shaft 72 carries the gear 76, said gears meshing, and the gear 76 meshing with the idler gear 16, thus these rolls are revolved. These rolls are used as feed rolls and also as pressure rolls for pressing the edge 66, which has been pasted and further folded down onto the paper 33 and now the paper has a double edge on each side, so that the ends of the egg tray form when formed will be strong and firm. The double edge is shown in Figs. 10 and 11.

In the brackets or housings 77, I support a carriage 78, which carries the male perforating die 79 which operates to punch or perforate the paper 33 in connection with female die 80, into a contour and configuration as shown in Fig. 11. The carriage 78 carrying the male die 79 moves down and up, to form the female die 80, through the agency of eccentrics 6 and eccentric arms 81, which at their lower extremity are pinned at the point 82 to the eccentrics 6, and at their upper extremity are pinned to the carriage 78 at the point 83, the eccentric arms being provided with lock nut adjustment 84. On the die carriage 78, I suitably support and connect a severing knife 85 which cuts a strip off of the main sheet 33, out of which the egg tray form is pressed. While this perforating and cutting is progressing, the cut away faces 74' and 51 on the sector rolls 73 and 50 resepctively, are not in contact with their co-acting rolls, and so the feeding of the paper is momentarily stopped, so that the dies and cutting knife can do their work; then as soon as the sector rolls again contact with their co-acting or operating rolls, the paper 33 again begins to feed forward and this action is repeated again and again.

The carriage 78 and the knife 85 receive their motion by reason of eccentric shaft 5 revolving on account of the gear 7 on said shaft meshing with gear 4 on shaft 2, which in turn receives its motion from the driving pulley 3. When the strip is cut it lies or rests in a guide table 86 which has an elongated slot 87, the strip lying in the guide table in Figs. 3 and 12, is marked 88. The guide table 86 rests on a supporting bracket 89, on the bottom of which I place a bearing 90, through which passes a short shaft 91, carrying at each end a sprocket wheel as 92 and 93. On the supporting bracket 89, I also place a bearing 94, carrying a sprocket 95, (see particularly Figs. 2 and 3) on a shaft 96. On a short shaft 97, I place another sprocket wheel 98, which short shaft is revolved by reason of bevel gear 101 meshing with bevel gear 9 on shaft 5. A sprocket chain 99 passes over sprockets 98 and 93 and turns short shaft 91, and a sprocket chain 100 passes over sprockets 92 and 95 and thus the shafts 96 and 91 are revolved. On the sprocket chain 100, I place a push finger 102 which pushes the strip 88 to the forming rolls to be hereinafter described. The finger 102 operates through the slot 103 along with the said sprocket chain 100. I further provide large brackets or housings 104 in which I journal two forming rolls 105 and 106, the roll 105 being the male and the roll 106 being the female roll. The male forming roll 105 has a series of formers 107 on its face and the female roll 106 has a series of depressions 108 on its face, the formers 107 fitting into the depressions 108 to press the paper between them into final form. On one end of the roll 105, I place the gear 109 and at one end of the roll 106 I place the gear 110 which mesh with each other, the gear 110 meshing with gear 112, on stud shaft 114 which is carried in the bracket 115, which meshes with a gear 113 on shaft 97; this shaft 97 is turned by bevel gear 101 meshing with bevel gear 9 on shaft 5, which shaft is turned by gear 7 meshing with gear 4 on shaft 2, which is operated by and carries the driving pulley 3.

It will not be necessary to give a full detailed account of the operation of the machine here, as the operation of various parts has been pointed out as they have been described and the operation of the machine will be readily understood.

The lines scored by the scoring knives are marked 120 as will be plainly seen in Fig. 11, the scoring however being done on the full sheet before it is cut into strips. The end or sides of the sheet which is folded as it passes through the machine is plainly shown in Fig. 11 where the sheet before being folded is marked 122 at its edge and after it is folded it appears as seen in Fig. 10 marked 123, it will be understood of course that this folding is done before the sheet is cut into strips.

The paper form or egg tray, after it has passed through the forming rolls last described is finished and either falls off the former rolls or is removed by stripper mechanism (not shown), of any convenient form. From the rolls it passes off by endless belt or otherwise out of the way of the machine. It will be noted that I operated on a full sheet through the machine and when the strip is cut off of this full sheet, it is moved laterally or at right angles from the other part of the machine and passes to the rolls to be formed. I may heat the forming rolls and moisten the paper, if I so desire, as described in my other application herein referred to.

The feeding of a continuous sheet through the machine and folding the edges thereof, and then after said edges have been folded to cut off a strip and simultaneously perforate and sever the same from the main sheet, and then feed the severed strip away from the path of the main sheet to quickly form the same into the desired configuration, enables me to produce the articles quickly and uniformly. These rolls, the dies, the cutting knife, the pasting device, the pressure rolls, the folding devices and the final forming rolls, are all timed to operate at the proper time to carry their motions and operations into effect, and this enables me to operate the machine very quickly and to produce the paper forms in large numbers.

From the above description it will be seen that the improved machine for making paper forms constructed according to my invention is of an inexpensive and extremely simple nature and is especially well adapted for the purpose for which it is designed, and it will also be obvious from the above description that the machine is capable of considerable modification without material departure from the principle and spirit of the invention, and for this reason I do not wish to be understood as limiting myself to the precise form and arrangement of the several parts of the machine as herein set forth in carrying out my invention in practice.

What I claim as new and my invention and desire to secure by Letters Patent is—

1. In a machine for making paper forms, a series of feeding and guiding rolls for a sheet of paper, means for pasting said paper at its edges, means for folding and uniting the pasted edge onto the main sheet, means for cutting a strip off of the sheet, forming rolls, means for conveying the strip laterally from the machine to said forming rolls for forming the strip into a paper form of the desired contour.

2. In a machine for making paper forms, a series of feeding and guiding rolls for a sheet of paper, means for pasting said paper at its edges, means for folding and uniting the pasted edge onto the main sheet, means for cutting and perforating a strip off of the main sheet forming rolls, means for conveying the strip laterally from the machine to said forming rolls for forming the strip into a paper form of the desired contour.

3. In a machine for making paper forms, a series of feeding and guiding rolls for a sheet of paper, means for scoring said sheet, means for pasting said paper at its edges, means for folding and uniting the pasted edge onto the main sheet, means for cutting a strip off of the sheet forming rolls, means for conveying the strip laterally from the machine to said forming rolls for forming the strip into a paper form of the desired contour.

4. In a machine for making paper forms, a series of feeding and guiding rolls for a sheet of paper, means for placing paste on the edges of said paper, means for giving the edges of said paper an initial bend, means for bringing said bent edges over onto and in contact with the body of the sheet, means for cutting said sheet into strips, forming rolls and means for feeding said cut strips laterally into said forming rolls for forming the paper form.

5. In a machine for making paper forms, a series of feeding and guiding rolls for a sheet of paper, means for placing paste on the edges of said paper, means for giving the edges of said paper an initial bend, means for bringing said bent edges over onto and in contact with the body of the sheet, means for perforating and cutting said sheet into strips, forming rolls and means for feeding said cut strips laterally into said forming rolls for forming the paper form.

6. In a machine for making paper forms, a series of feeding and guiding rolls for a sheet of paper, means for placing paste on the edges of said paper, means for giving the edges of said paper an initial bend, means for bringing said bent edges over onto and in contact with the body of the sheet, means for cutting said sheet into strips, forming rolls and means for feeding said cut strips into said forming rolls for forming the paper form.

7. In a machine for making paper forms, a series of feeding and guiding rolls for a sheet of paper, means for scoring said paper, means for placing paste on the edges of said paper, means for giving the edges of said paper an initial bend, means for bringing said bent edges over onto and in contact with the body of the sheet, means for cutting said sheet into strips, forming rolls and means for feeding said cut strips laterally into said forming rolls for forming the paper form.

8. In a machine for making paper forms, means for feeding a sheet of paper, means for doubling the edges of the paper as it passes through the machine, means for cutting said sheet with its doubled edges into strips, a set of rotary forming rolls and means for feeding the same to the set of rotary forming rolls.

9. In a machine for making paper forms, means for feeding a sheet of paper, means for doubling the edges of the paper as it passes through the machine, means for cutting said sheet with its doubled edges into strips, rotary forming rolls, and means for feeding said strips laterally into said rotary forming rolls.

10. In a machine for making paper forms, means for scoring, pasting and doubling the edges of the sheet while feeding the same through the machine and means for perforating and cutting the same into strips, forming rolls and means for feeding the cut strips at right angles to the machine through said forming rolls for forming the strip into the paper form desired.

11. In a machine for making paper forms, means for feeding a sheet of paper, means for scoring said paper, means for perforating said paper, means for severing a strip from said paper, laterally disposed forming rolls and means for feeding the severed strip laterally to said laterally disposed forming rolls.

12. In a machine for making paper forms, means for feeding a sheet of paper, means for scoring said paper, means for perforating said paper and means for simultaneously cutting a strip therefrom, laterally disposed forming rolls and means for feeding the cut strip to said laterally disposed forming rolls for forming the same.

ANDREW P. TUCKER

Witnesses:
JOSEPH A. BROWN,
JOHN W. STREHLI.

Copies of this patent may be obtained for five cents each, by addressing the "Commissioner of Patents, Washington, D. C."